(12) United States Patent
Shah et al.

(10) Patent No.: US 12,032,662 B2
(45) Date of Patent: Jul. 9, 2024

(54) PROGRAMMABLE MODEL-DRIVEN LICENSE MANAGEMENT AND ENFORCEMENT IN A MULTI-TENANT SYSTEM

(71) Applicant: Juniper Networks, Inc., Sunnyvale, CA (US)

(72) Inventors: Viren L. Shah, Bangalore (IN); Jayanthi R, Bangalore (IN); Ritesh Shelat, Bangalore (IN); Premchandar N, Bangalore (IN); Bhaskar T. Reddy, Bangalore (IN); Chandrasekhar A, Bengaluru (IN)

(73) Assignee: Juniper Networks, Inc., Sunnyvale, CA (US)

(*) Notice: Subject to any disclaimer, the term of this patent is extended or adjusted under 35 U.S.C. 154(b) by 332 days.

(21) Appl. No.: 17/589,962

(22) Filed: Feb. 1, 2022

(65) Prior Publication Data
US 2023/0195858 A1 Jun. 22, 2023

(30) Foreign Application Priority Data

Dec. 16, 2021 (IN) .............................. 202141058626

(51) Int. Cl.
*G06F 21/10* (2013.01)
*G06F 9/50* (2006.01)
(Continued)

(52) U.S. Cl.
CPC .......... *G06F 21/105* (2013.01); *G06F 9/5072* (2013.01); *G06F 21/10* (2013.01);
(Continued)

(58) Field of Classification Search
CPC ........ G06F 21/105; G06F 21/12; G06F 21/44; G06F 2221/2141; G06F 9/5072; G06N 20/00
See application file for complete search history.

(56) References Cited

U.S. PATENT DOCUMENTS 11,159,531 B2   10/2021   Momchilov
2006/0190408 A1* 8/2006   Cook ..................... G06Q 30/06
                                                   705/59
(Continued)

FOREIGN PATENT DOCUMENTS

KR        101842925 B1    3/2018

OTHER PUBLICATIONS

Das et al., "Building a Rule-Based Platform to Manage Netflix Membership SKUs at Scale," Website: https://netflixtechblog.com/building-a-rule-based-platform-to-manage-netflix-membership-skus-at-scale-e3c0f82aa7bc, Feb. 16, 2021, 12 Pages.
(Continued)

*Primary Examiner* — Viet D Vu
(74) *Attorney, Agent, or Firm* — Harrity & Harrity, LLP

(57) ABSTRACT

A device may receive license data identifying device licenses and organization licenses associated with an organization of users of a multi-tenant system, and may identify, in the license data, entitlements for licenses associated with the organization. The device may combine the entitlements to generate combined entitlements, and may determine an entitlement count of the combined entitlements. The device may add quantities of new entitlements to the entitlement count, and may identify, in the license data, roles of the users and capabilities associated with each of the roles. The device may map the entitlements and the capabilities to generate a mapping, and may authorize a particular user based on the mapping. The device may process usage of the entitlements, with a machine learning model, to predict future usage of the
(Continued)

entitlements, and may determine entitlement recommendations based on the future usage. The device may provide the entitlement recommendations for display.

20 Claims, 11 Drawing Sheets

(51) Int. Cl.
*G06F 21/12* (2013.01)
*G06F 21/44* (2013.01)
*G06N 20/00* (2019.01)

(52) U.S. Cl.
CPC .............. *G06F 21/12* (2013.01); *G06F 21/44* (2013.01); *G06N 20/00* (2019.01); *G06F 2221/2141* (2013.01)

(56) References Cited

U.S. PATENT DOCUMENTS

| 2019/0102849 | A1 | 4/2019 | Bertot et al. |
| 2019/0245888 | A1 | 8/2019 | Martinez et al. |
| 2020/0401390 | A1* | 12/2020 | Borthakur ............. G06F 21/105 |
| 2021/0035115 | A1* | 2/2021 | Savir ..................... G06F 21/105 |
| 2023/0044720 | A1* | 2/2023 | Boyapalle ........... H04L 63/0876 |

OTHER PUBLICATIONS

Hardt, "The OAuth 2.0 Authorization Framework," Internet Engineering Task Force (IETF), Oct. 2012, 76 Pages.

* cited by examiner

| Property | Details |
|---|---|
| SKU Name | Name of the SKU |
| Type | Enum – possible values of "base" or "add on" |
| Entitlements | List of entitlements in SKU |
| Entitlements: Name | Name of the entitlement |
| Entitlements: Allocation | Allocated entitlement |
| Entitlements: Allocation: Size | Size of the allocated entitlement |
| Entitlements: Allocation: Unit | Units for the allocated entitlement size |
| License duration | |
| License duration period: years | License duration in years |
| License duration period: months | License duration in months |
| License duration period: days | License duration in days |
| Meta info: Object type | Type of object on which the license would be enforced |
| Meta info: Size | Maximum number of objects on which the license would be applied |

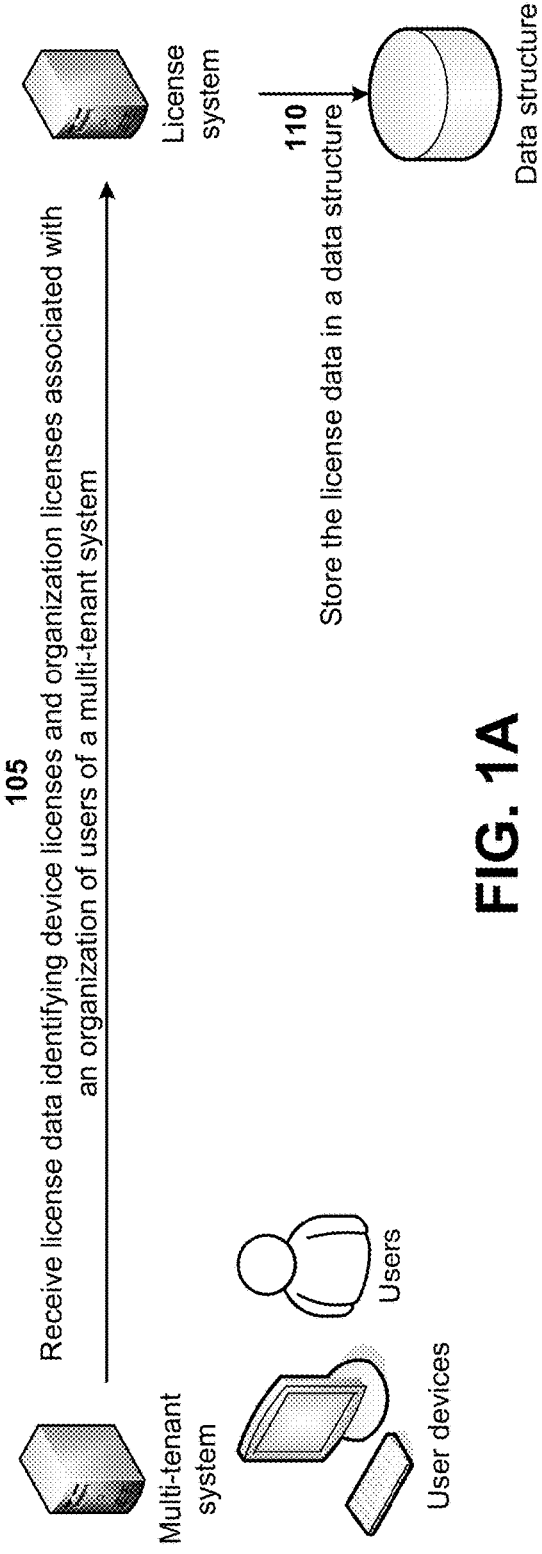

FIG. 1A

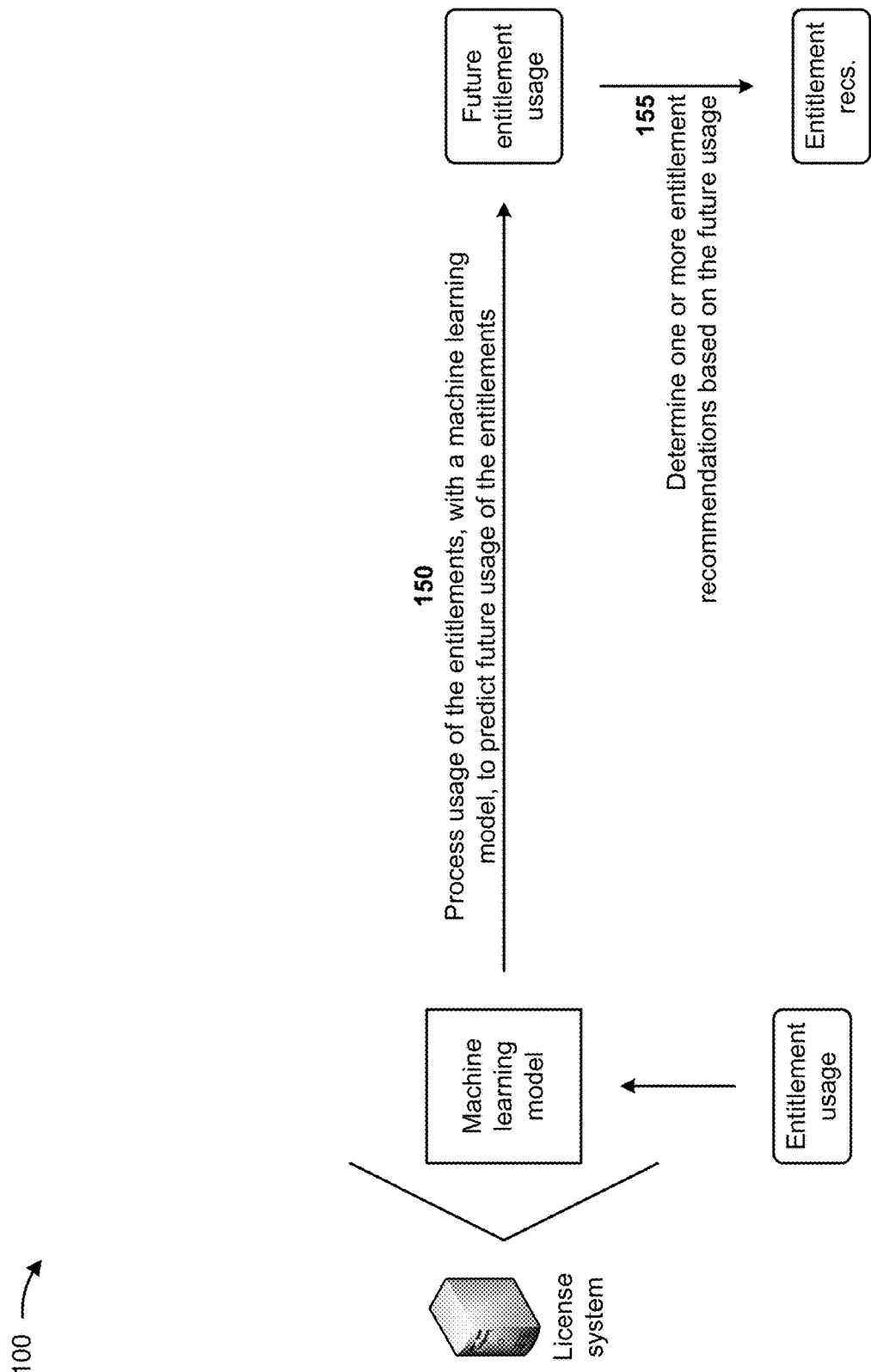

PROGRAMMABLE MODEL-DRIVEN LICENSE MANAGEMENT AND ENFORCEMENT IN A MULTI-TENANT SYSTEM

CROSS-REFERENCE TO RELATED APPLICATION

This application claims priority to Indian Provisional Application No. 202141058626 entitled "PROGRAMMABLE MODEL-DRIVEN LICENSE MANAGEMENT AND ENFORCEMENT IN A MULTI-TENANT SYSTEM," filed on Dec. 16, 2021. The entire content of which is expressly incorporated herein by reference.

BACKGROUND

Product license enforcement is a mechanism or mechanisms that are used to manage product license compliance. Product license management is a mechanism tool that helps businesses document and manage product licenses to ensure compliance with usage terms and conditions.

SUMMARY

Some implementations described herein relate to a method. The method may include receiving license data identifying device licenses and organization licenses associated with an organization of users of a multi-tenant system, and identifying, in the license data, entitlements for one or more licenses associated with the organization. The method may include combining the entitlements to generate combined entitlements, and determining an entitlement count of the combined entitlements. The method may include adding quantities of one or more new entitlements to the entitlement count, and identifying, in the license data, roles of the users and capabilities associated with each of the roles. The method may include mapping the entitlements and the capabilities to generate an entitlement-to-capability mapping, and authorizing a particular user of the multi-tenant system based on the entitlement-to-capability mapping. The method may include processing usage of the entitlements, with a machine learning model, to predict future usage of the entitlements, and determining one or more entitlement recommendations based on the future usage. The method may include providing the one or more entitlement recommendations for display.

Some implementations described herein relate to a device. The device may include one or more memories and one or more processors. The one or more processors may be configured to receive license data identifying device licenses and organization licenses associated with an organization of users of a multi-tenant system, and store the license data in a data structure associated with the device. The one or more processors may be configured to identify, in the license data, entitlements for one or more licenses associated with the organization, and combine the entitlements to generate combined entitlements. The one or more processors may be configured to determine an entitlement count of the combined entitlements, and add quantities of one or more new entitlements to the entitlement count. The one or more processors may be configured to identify, in the license data, roles of the users and capabilities associated with each of the roles, and map the entitlements and the capabilities to generate an entitlement-to-capability mapping. The one or more processors may be configured to authorize a particular user of the multi-tenant system based on the entitlement-to-capability mapping, and process usage of the entitlements, with a machine learning model, to predict future usage of the entitlements. The one or more processors may be configured to determine one or more entitlement recommendations based on the future usage, and provide the one or more entitlement recommendations for display.

Some implementations described herein relate to a non-transitory computer-readable medium that stores a set of instructions for a device. The set of instructions, when executed by one or more processors of the device, may cause the device to receive license data identifying device licenses and organization licenses associated with an organization of users of a multi-tenant system, and identify, in the license data, entitlements for one or more licenses associated with the organization. The set of instructions, when executed by one or more processors of the device, may cause the device to combine the entitlements to generate combined entitlements, and determine an entitlement count of the combined entitlements. The set of instructions, when executed by one or more processors of the device, may cause the device to add quantities of one or more new entitlements to the entitlement count, and subtract quantities of one or more expired entitlements from the entitlement count. The set of instructions, when executed by one or more processors of the device, may cause the device to identify, in the license data, roles of the users and capabilities associated with each of the roles, and map the entitlements and the capabilities to generate an entitlement-to-capability mapping. The set of instructions, when executed by one or more processors of the device, may cause the device to authorize particular user of the multi-tenant system based on the entitlement-to-capability mapping, and process usage of the entitlements, with a machine learning model, to predict future usage of the entitlements. The set of instructions, when executed by one or more processors of the device, may cause the device to determine one or more entitlement recommendations based on the future usage, and provide the one or more entitlement recommendations for display.

BRIEF DESCRIPTION OF THE DRAWINGS

FIGS. 1A-1H are diagrams of an example associated with programmable model-driven license management and enforcement in a multi-tenant system.

DETAILED DESCRIPTION

Figure 1B:
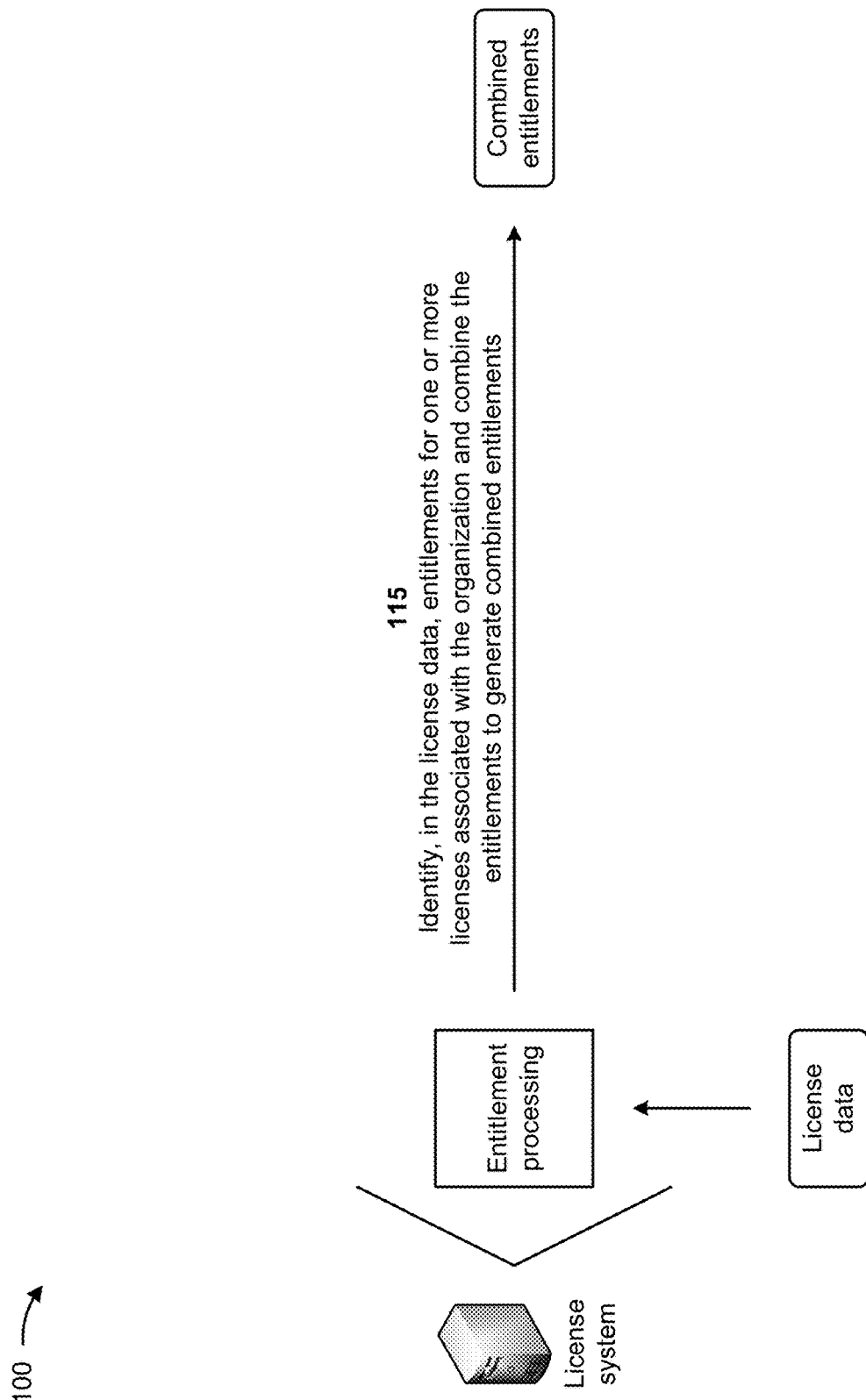

The following detailed description of example implementations refers to the accompanying drawings. The same reference numbers in different drawings may identify the same or similar elements.

Typically, organizations have product engineering teams that develop products (e.g., software products, cloud microservices, applications, and/or the like) and marketing and licensing teams that develop various licenses based on marketing needs. Products, such as applications, need to enforce access to features based on licenses associated with the applications. However, current license management and enforcement systems are unable to support new licenses for an application of a multi-tenant system (e.g., a software as a service (SaaS) system that serves multiple users) without causing down time for a user (e.g., while waiting for approval of the new licenses). The multi-tenant system may include microservices with policies that detail capabilities to application programming interfaces (APIs) mappings. A license for the multi-tenant system may include entitlements associated with the license, such as an entitlement for storage, an entitlement for a virtual private network (VPN), an entitlement for a policy, and/or the like. Current license management and enforcement systems also require microservices and/or modules in the application to be updated for every license addition and/or modification. Thus, current license management and enforcement systems consume computing resources (e.g., processing resources, memory resources, communication resources, and/or the like), networking resources, and/or the like, associated with causing downtime for a user when new licenses are introduced for an application, causing delays or downtime for a user when microservices and/or modules in the application to be updated for every license addition and/or modification, failing to adequately manage licenses for a multi-tenant system, and/or the like.

Some implementations described herein relate to a license system that provides programmable model-driven license management and enforcement in a multi-tenant system. For example, a license system may receive license data identifying device licenses and organization licenses associated with an organization of users of a multi-tenant system, and may identify, in the license data, entitlements for one or more licenses associated with the organization. The license system may combine the entitlements to generate combined entitlements, and may determine an entitlement count of the combined entitlements. The license system may add quantities of one or more new entitlements to the entitlement count, and may identify, in the license data, roles of the users and capabilities associated with each of the roles. The license system may map the entitlements and the capabilities to generate an entitlement-to-capability mapping, and may authorize a particular user of the multi-tenant system based on the entitlement-to-capability mapping. The license system may process usage of the entitlements, with a machine learning model, to predict future usage of the entitlements, and may determine one or more entitlement recommendations based on the future usage. The license system may provide the one or more entitlement recommendations for display.

In this way, the license system provides programmable model-driven license management and enforcement in a multi-tenant system. For example, the license system may define new licenses during execution of applications in a multi-tenant system, and may consolidate entitlements (e.g., features or capabilities enabled by a license) based on licenses associated with an organization utilizing the multi-tenant system. The license system may map entitlements to capabilities of the applications, which may enable license enforcement as part of authorization through identity management. The license system may manage quotas (e.g., usage quotas, quantity quotas, and/or the like) associated with the licenses, and may utilize a machine learning model to recommend the entitlements based on the entitlement usage. Thus, the license system conserves computing resources, networking resources, and/or the like that would otherwise have been consumed by causing downtime for a user when new licenses are introduced for an application, causing delays or downtime for a user when microservices and/or modules in the application to be updated for every license addition and/or modification, failing to adequately manage licenses for a multi-tenant system, and/or the like.

FIGS. 1A-1H are diagrams of an example 100 associated with providing programmable model-driven license management and enforcement in a multi-tenant system. As shown in FIGS. 1A-1H, example 100 includes user devices associated with users of a multi-tenant system that is managed by a license system. The multi-tenant system may include a single instance of software (e.g., cloud microservices) and supporting infrastructure that serves multiple users (e.g., tenants). Each user may share the software and a may share a database. Each user's data may be isolated and may remain invisible to other users. In some implementations, the multi-tenant system may include a software as a service (SaaS) system. Further details of the user device, the multi-tenant system, and the license system are provided elsewhere herein.

As shown in FIG. 1A, and by reference number 105, the license system may receive license data identifying device licenses and organization licenses associated with an organization of the users of the multi-tenant system. For example, the license system may receive the license data from the multi-tenant system, the user devices associated with the users of the organization, and/or the like. In some implementations, the multi-tenant system may generate the device licenses when providing the user devices access to devices of the multi-tenant system, when providing the user devices access to software provided by the devices of the multi-tenant system, and/or the like. In some implementations, the multi-tenant system may receive, from one or more of the user devices, a request for access to devices of the multi-tenant system, and the multi-tenant system may generate the device licenses based on the request. The multi-tenant system may provide the device licenses to the license system. Alternatively, the multi-tenant system may provide the request to the license system, and the license system may generate the device licenses based on the request.

In some implementations, the multi-tenant system may generate the organization licenses when providing the organization access to services of the multi-tenant system, when providing the organization access to software provided by the multi-tenant system, and/or the like. In some implementations, the multi-tenant system may receive, from one or more of the user devices, a request for access to services of the multi-tenant system, and the multi-tenant system may generate the organization licenses based on the request. The multi-tenant system may provide the organization licenses to the license system. Alternatively, the multi-tenant system may provide the request to the license system, and the license system may generate the organization licenses based on the request.

Each of the device licenses and the organization licenses may include fields identifying a name of a device, a service, software, and/or the like to be licensed; a type of license (e.g., a base license, an add on license, and/or the like); entitlements associated with the license (e.g., identifying names, allocation sizes, allocation units, and/or the like of the entitlements); a duration of the license (e.g., in years, months, days, a start date, a termination date, and/or the like); an object type associated with the license; a quantity of objects associated with the license; and/or the like. For example, a device license for a storage device may include fields identifying a name of the storage device; a type of license (e.g., base); entitlements associated with the license (e.g., log storage of ten gigabytes, a virtual private network (VPN), a policy, a network address translation (NAT), device health statistics, and/or the like); a duration of the license (e.g., one year); an object type (e.g., a device object); a quantity of objects (e.g., ten objects); and/or the like. In another example, an organization license for cloud storage may include fields identifying a name of the cloud storage, a type of license (e.g., add on), entitlements associated with the license (e.g., log storage of one terabyte), a duration of the license (e.g., five years), an object type (e.g., an organization), and/or the like.

As further shown in FIG. 1A, and by reference number 110, the license system may store the license data in a data structure associated with the license system. For example, the license system may store the license data in a database, a table, a list, and/or the like associated with the license system. In some implementations, the license system may store the license data in the data structure in accordance with the fields (e.g., a name, a type of license, entitlements associated with the license, a start date and duration of the license, an object type associated with the license; a quantity of objects associated with the license, and/or the like) provided in the device licenses and the organization licenses.

As shown in FIG. 1B, and by reference number 115, the license system may identify, in the license data, entitlements for one or more licenses associated with the organization and may combine the entitlements to generate combined entitlements. For example, the organization may be associated with one or more licenses, such as one or more device licenses and/or one or more organization licenses. The license system may identify, in the license data, the one or more licenses associated with the organization. For example, the license system may parse the license data to generate parsed license data (e.g., parsed according to the fields of the licenses), and may identify the one or more licenses associated with the organization in the parsed license data. The license system may identify, in the parsed license data of the one or more licenses, the entitlements for the one or more licenses associated with the organization. The license system may combine the entitlements, for the one or more licenses associated with the organization, to generate the combined entitlements. For example, a security device management license may provide one-hundred (100) gigabytes (GB) of storage, an application insights license may provide five-hundred (500) GB of storage, and a secure access service edge (SASE) license may provide one-thousand and two-hundred (1,200) GB of storage. In such an example, the combined storage entitlements may provide one-thousand and eight-hundred (1,800) GB. In some implementations, the license system may store the combined entitlements in the data structure associated with the license system.

Figure 1C:
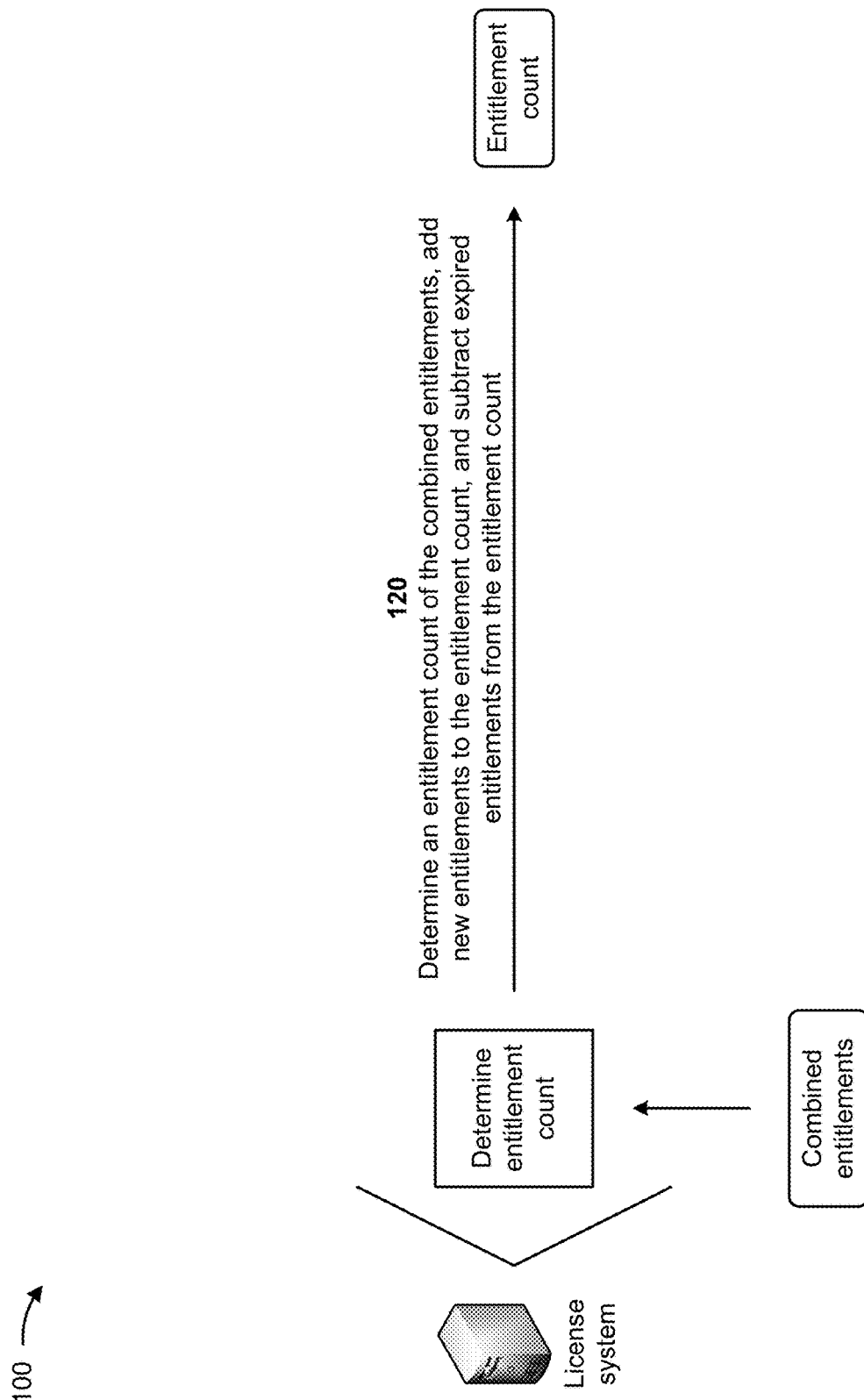

As shown in FIG. 1C, and by reference number 120, the license system may determine an entitlement count of the combined entitlements, may add new entitlements to the entitlement count, and may subtract expired entitlements from the entitlement count. For example, the license system may add the quantity of entitlements provided in the combined entitlements to determine the entitlement count of the combined entitlements. In some implementations, if the organization receives a new license with new entitlements or receives new entitlements to an existing license, the license system may add the quantity of the new entitlements to the entitlement count to generate an updated entitlement count. In some implementations, if one or more entitlements, of the one or more licenses associated with the organization, expire, the license system may subtract the quantity of the expired entitlements from the entitlement count. In some implementations, the organization may pay for a threshold quantity of entitlements for the licenses of the organization.

In such implementations, the license system may compare the entitlement count to the threshold quantity to ensure that the threshold quantity is not exceeded by the entitlement count.

Figure 1D:
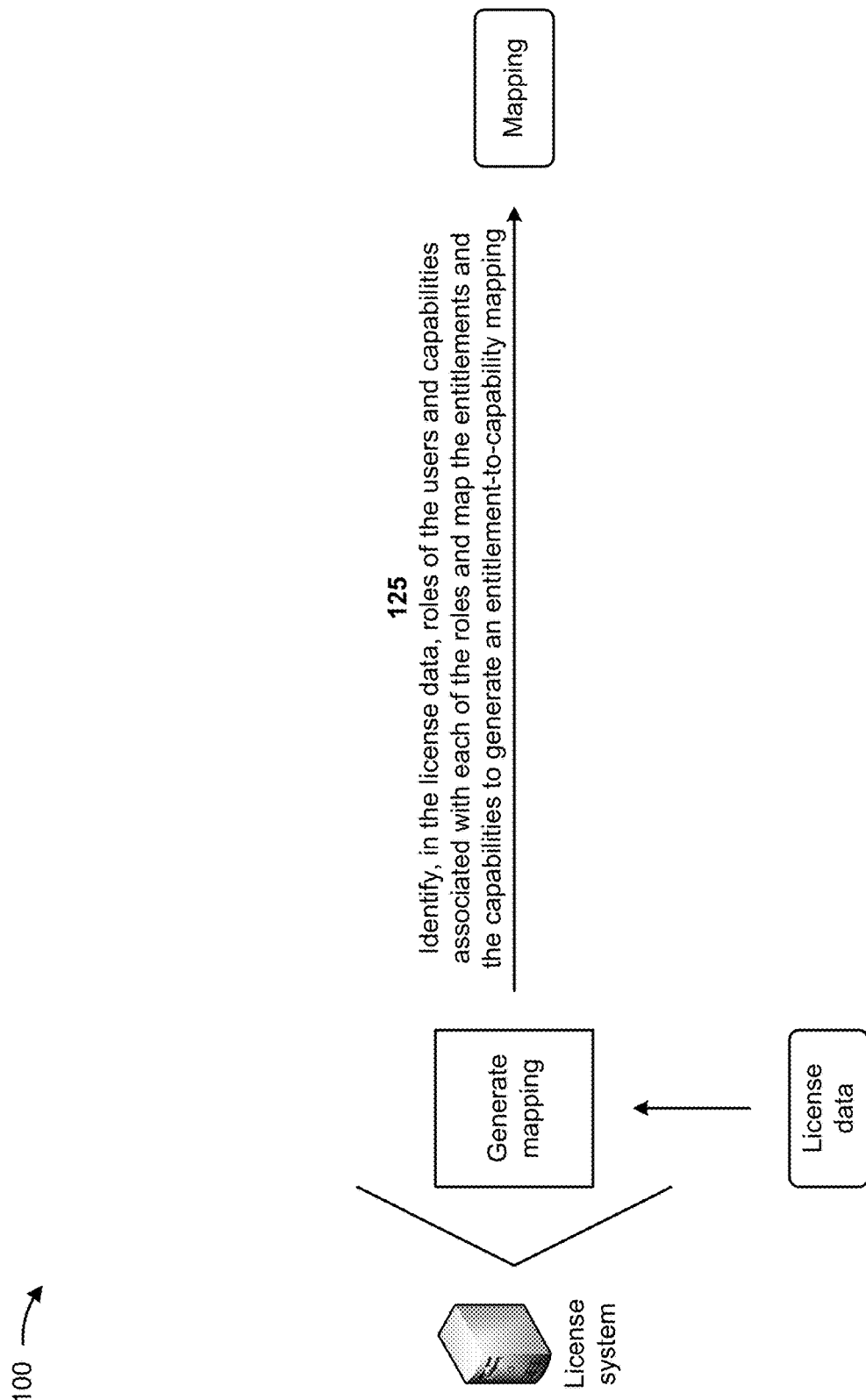

As shown in FIG. 1D, and by reference number 125, the license system may identify, in the license data, roles of the users and capabilities associated with each of the roles and may map the entitlements and the capabilities to generate an entitlement-to-capability mapping. For example, each of the users of the multi-tenant system may be associated with a role. A role is associated with a collection of capabilities of devices, microservices, software, and/or the like provided by the multi-tenant system. In some implementations, the multi-tenant system may include microservices with policies that detail capabilities to application programming interfaces (APIs) mappings. In some implementations, the license system may parse the license data to generated parsed license data (e.g., parsed according to the fields of the licenses), and may identify the roles of the users and the capabilities associated with each of the roles in the parsed license data. The license system may identify, in the parsed license data of the one or more licenses, the entitlements for the one or more licenses associated with the organization. The license system may map the entitlements and the capabilities associated with each of the roles to generate the entitlement-to-capability mapping. For example, the license system may identify first capabilities associated with a first user, second capabilities associated with a second user, and third capabilities associated with a third user. The license system may map one or more of the entitlements to the first capabilities to generate a first entitlement-to-capability mapping, may map one or more of the entitlements to the second capabilities to generate a second entitlement-to-capability mapping, and may map one or more of the entitlements to the third capabilities to generate a third entitlement-to-capability mapping. The first entitlement-to-capability mapping, the second entitlement-to-capability mapping, and the third entitlement-to-capability mapping may correspond to the entitlement-to-capability mapping.

Figure 1E:
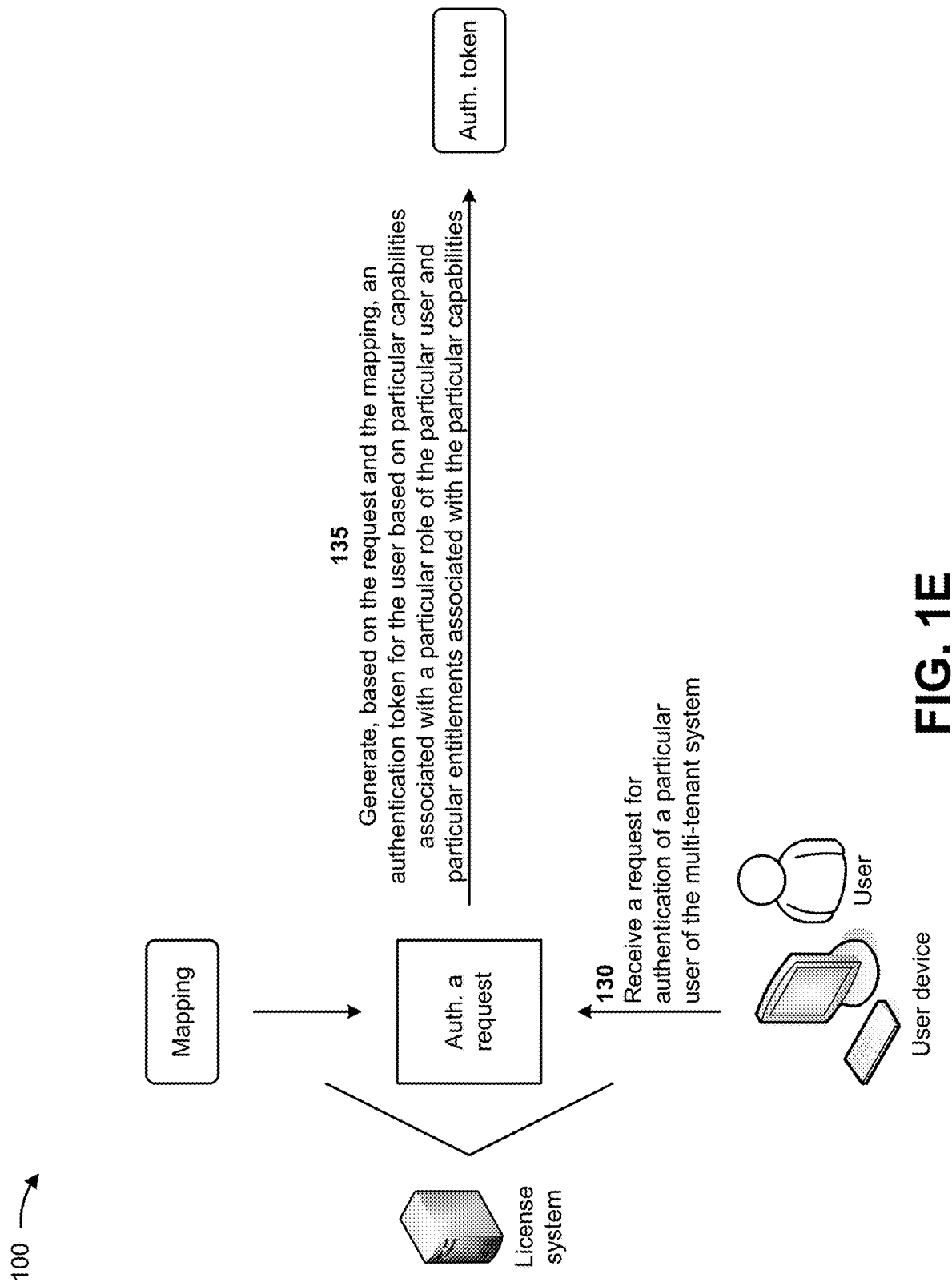

As shown in FIG. 1E, and by reference number 130, the license system may receive a request for authentication of a particular user of the multi-tenant system. For example, the license system may receive, from a user device, the request for authentication of the particular user of the multi-tenant system and the user device. The request may include a request to access a device, a service, software, and/or the like provided by the multi-tenant system (e.g., via the user device of the particular user). In some implementations, the request may include information identifying a particular role of the particular user (e.g., a network administrator, a data entry operator, and/or the like). In some implementations, the request may be received by the multi-tenant system from the user device. In such implementations, the multi-tenant system may forward the request to the license system, and the license system may receive the request from the multi-tenant system.

As further shown in FIG. 1E, and by reference number 135, the license system may generate, based on the request and the entitlement-to-capability mapping, an authentication token for the user based on particular capabilities associated with a particular role of the particular user and particular entitlements associated with the particular capabilities. For example, when the license system receives the request for authentication, the license system may identify the particular role of the particular user in the request for authentication. In some implementations, the license system may determine first particular capabilities corresponding to the particular role of the particular user, based on identifying, in the license data, the roles of the users and the capabilities associated with each of the roles, as described above. The license system may also identify particular entitlements associated with the device, the service, the software, and/or the like to be accessed by the particular user. In some implementations, the license system may determine second particular capabilities corresponding to the particular entitlements based on the entitlement-to-capability mapping. The license system may combine the first particular capabilities and the second particular capabilities to generate resultant particular capabilities. The license system may generate the authentication token and may populate the authentication token with the resultant particular capabilities. If the particular user is authenticated, the license system may provide the authentication token to the user device. The user device may utilize the authentication token for requests (e.g., API calls) provided to the multi-tenant system.

Figure 1F:
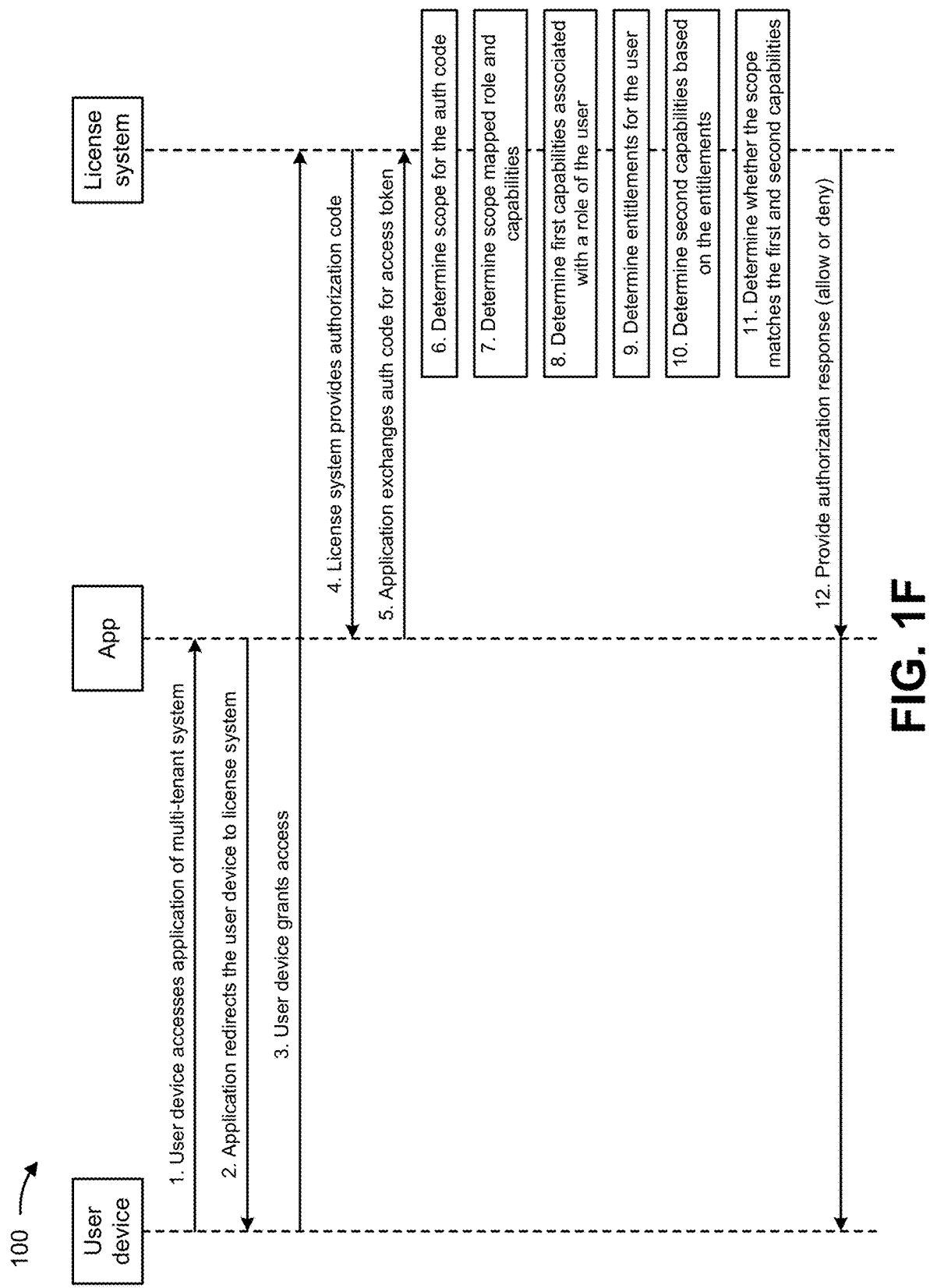

FIG. 1F is an example call flow diagram associated with authorizing the user device to access an application (App) of the multi-tenant system. As shown at step 1, the user device may access the application of the multi-tenant system. As shown at steps 2 and 3, the application may redirect the user device to the license system, and the user device may grant access to the redirection to the license system. As shown at steps 4 and 5 of FIG. 1F, the license system may provide an authorization code to the application, and the application may exchange, with the license system, the authorization code for an access token. The access token may be utilized to access a resource of the multi-tenant system (e.g., the application). A resource owner may include an owner of the resource that is being accessed. A client may include an application that accesses protected resources on behalf of the resource owner. A resource server may include a server that hosts the protected resources and accepts and/or responds to requests by clients using access tokens. An authorization server may include server that issues access tokens after successfully authorizing a client and a resource owner. An authorization grant may include a credential that represents the resource owner's authorization (to access protected resources) used by the client to obtain an access token. An access token may include a credential used to access protected resources and that represents specific scopes and durations of access, granted by the resource owner, and enforced by the resource server and the authorization server. A scope may define permissions of an access token and may define what resources can be accessed using the access token.

As shown at steps 6 and 7 of FIG. 1F, the license system may determine a scope of the authorization code and may determine scope-mapped role and capabilities. As shown at step 8, the license system may determine first capabilities associated with a role of the user. As shown at steps 9 and 10, the license system may determine entitlements for the user and may determine second capabilities based on the entitlements. As shown at step 11, the license system may determine whether the scope matches the first capabilities and the second capabilities. For example, the license system may determine whether the capabilities of the scope-mapped role and capabilities substantially match (e.g., within a threshold percentage, exactly matches, and/or the like) the first capabilities and the second capabilities. If the scope matches the first capabilities and the second capabilities, the license system may generate an authorization response that allows the user device to access the application. If the scope fails to match the first capabilities and the second capabilities, the license system may generate an authorization response that denies access of the user device to the application. As shown at step 12, the license system may provide an authorization response to the user device via the application.

Figure 1G:
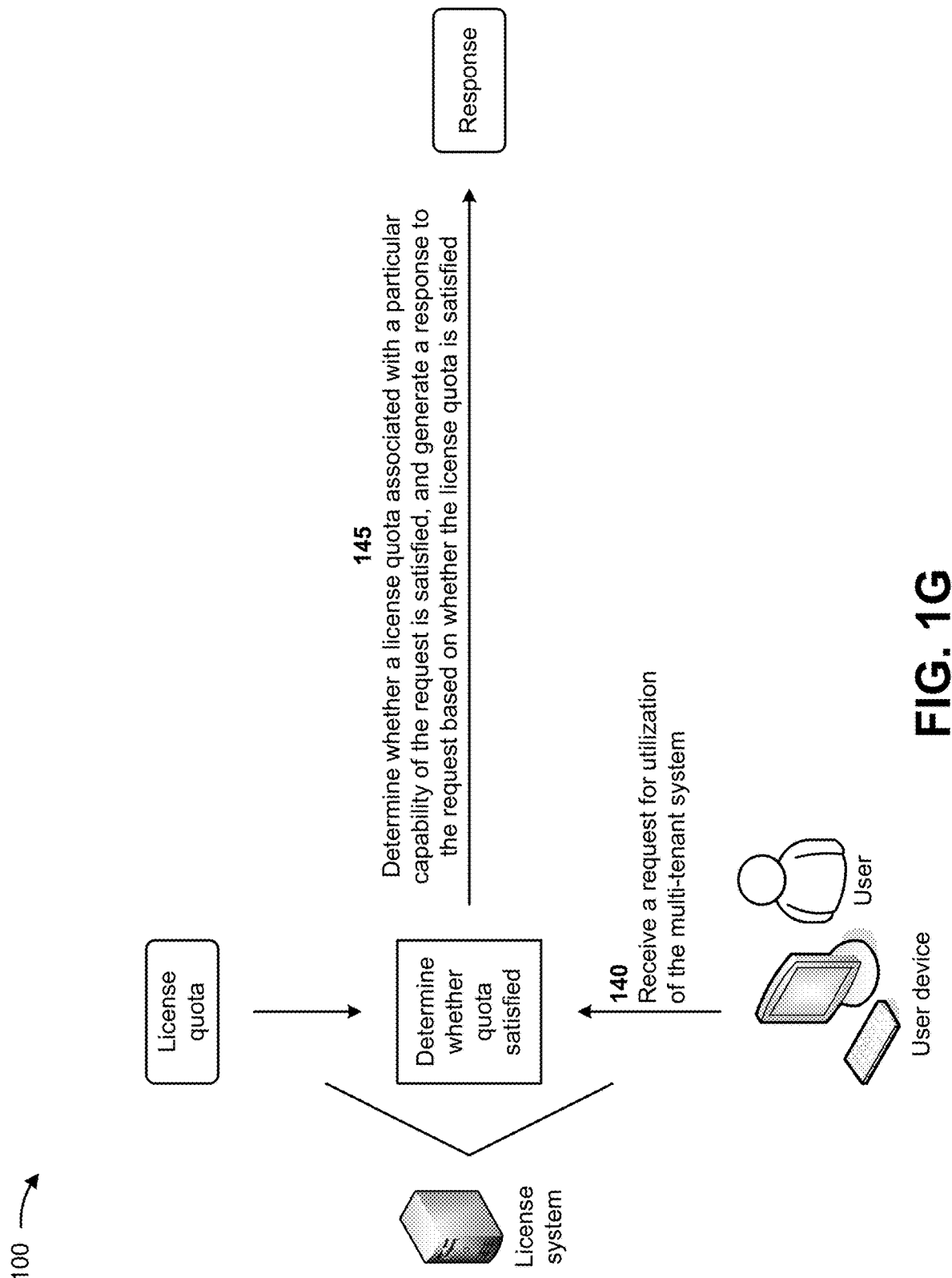

As shown in FIG. 1G, and by reference number 140, the license system may receive a request for utilization of the multi-tenant system. For example, the license system may receive, from a user device, the request for the utilization of the multi-tenant system. The request for the utilization may include one or more capabilities associated with utilizing the multi-tenant system. In some implementations, the request for the utilization may include a particular capability associated with utilizing the multi-tenant system. In some implementations, the request may be received by the multi-tenant system from the user device. In such implementations, the multi-tenant system may forward the request to the license system, and the license system may receive the request from the multi-tenant system.

As further shown in FIG. 1G, and by reference number 145, the license system may determine whether a license quota associated with a particular capability of the request is satisfied, and may generate a response to the request based on whether the license quota is satisfied. For example, the license system may maintain a license quota for every entitlement capability for the licenses associated with the organization. The license quota may include information identifying an entitlement capability, a unit associated with the capability (e.g., memory size, processor utilization, and/or the like), a threshold quantity of units that may be utilized, and/or a source (e.g., a resource) associated with entitlement capability. When a user attempts to utilize the multi-tenant system (e.g., a resource of the multi-tenant system), the license system may authorize the user, may determine whether the user is authorized for the utilization, may determine whether the user is associated with a licensed capability to utilize the multi-tenant system, and may determine whether the license quota is satisfied. As part of the license quota enforcement, the license system may identify the license quota associated with the particular capability of the request. If the license quota is satisfied (e.g., less than a threshold quantity of units is being utilized), the license system may generate a response to the request that allows the user device to utilize the multi-tenant system. The license system may also update usage in license quota associated with the particular capability. If the license quota is not satisfied (e.g., not more than a threshold quantity of units is being utilized), the license system may generate a response to the request that denies the user device access to the multi-tenant system. In some implementations, the license system may provide the response to the user device (e.g., via the multi-tenant system).

As shown in FIG. 1H, and by reference number 150, the license system may process usage of the entitlements, with a machine learning model, to predict future usage of the entitlements. For example, the license system may predict the future usage of the entitlements based on current usage of the entitlements and/or historical usage of the entitlements. In some implementations, the license system may utilize a machine learning model, such as a univariate time series forecasting model, to predict the future usage of the entitlements based on the current usage of the entitlements and/or the historical usage of the entitlements. The univariate time series forecasting model may include two variables—time and entitlement usage. In some implementations, the machine learning model may analyze the entitlement usage in uniform rates (e.g., every twenty-four hours). The univariate time series forecasting model may be separately created for each organization.

As further shown in FIG. 1H, and by reference number 155, the license system may determine one or more entitlement recommendations based on the future usage. For example, once future usage of the entitlements is predicted, the license system may determine the one or more entitlement recommendations based on the future usage. The license system may initialize the entitlements associated with the future usage. For each entitlement associated with the future usage, the license system may check if a forecasted usage (e.g., a quantity) is available in a license quota associated with the entitlement. If the forecasted usage is available in the license quota, the license system may determine one or more entitlement recommendations for the entitlement. In some implementations, the one or more entitlement recommendations may include a recommendation to increase a quantity of a particular entitlement, a recommendation to add a new entitlement, and/or the like. In some implementations, the license system may provide APIs to support programmability for the one or more recommended entitlements, may add a new recommended entitlement through an API, and/or the like. If a new entitlement is to be added, the license system may add the new entitlement to the entitlement-to-capability mapping and may add capabilities to the new entitlement by upgrading a microservice or by adding a new microservice.

In this way, the license system provides programmable model-driven license management and enforcement in a multi-tenant system. For example, the license system may define new licenses during execution of applications in a multi-tenant system, and may consolidate entitlements (e.g., features or capabilities enabled by a license) based on licenses associated with an organization utilizing the multi-tenant system. The license system may map entitlements to capabilities of the applications, which may enable license enforcement as part of authorization through identity management. The license system may manage quotas (e.g., usage quotas, quantity quotas, and/or the like) associated with the licenses, and may utilize a machine learning model to recommend the entitlements based on the entitlement usage. Thus, the license system conserves computing resources, networking resources, and/or the like that would otherwise have been consumed by causing downtime for a user when new licenses are introduced for an application, causing delays or downtime for a user when microservices and/or modules in the application to be updated for every license addition and/or modification, failing to adequately manage licenses for a multi-tenant system, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
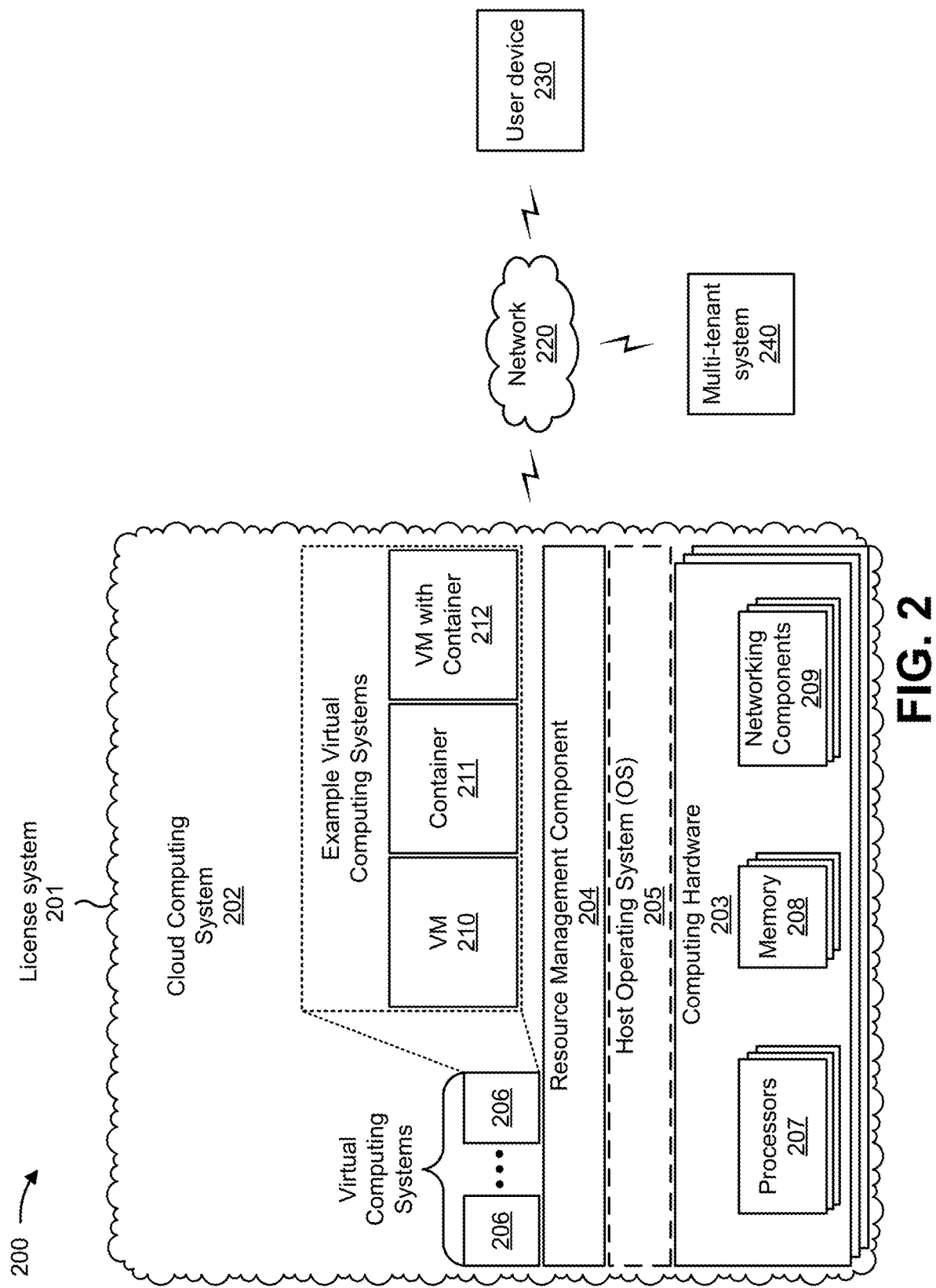
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a license system 201, which may include one or more elements of and/or may execute within a cloud computing system 202. The cloud computing system 202 may include one or more elements 203-212, as described in more detail below. As further shown in FIG. 2, the environment 200 may include a network 220, a user device 230, and/or a multi-tenant system 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

The virtual computing system 206 includes a virtual environment that enables cloud-based execution of operations and/or processes described herein using the computing hardware 203. As shown, the virtual computing system 206 may include the virtual machine 210, the container 211, or a hybrid environment 212 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the license system 201 may include one or more elements 203-212 of the cloud computing system 202, may execute within the cloud computing system 202, and/or may be hosted within the cloud computing system 202, in some implementations, the license system 201 may not be cloud-based (e.g., may be implemented outside of a cloud computing system) or may be partially cloud-based. For example, the license system 201 may include one or more devices that are not part of the cloud computing system 202, such as device 300 of FIG. 3, which may include a stand-alone server or another type of computing device. The license system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 includes one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The multi-tenant system 240 includes one or more devices capable of receiving, generating, storing, processing, providing, and/or routing information, as described elsewhere herein. The multi-tenant system 240 may include a communication device and/or a computing device. For example, the multi-tenant system 240 may include a server, such as an application server, a client server, a web server, a database server, a host server, a proxy server, a virtual server (e.g., executing on computing hardware), or a server in a cloud computing system. In some implementations, the multi-tenant system 240 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
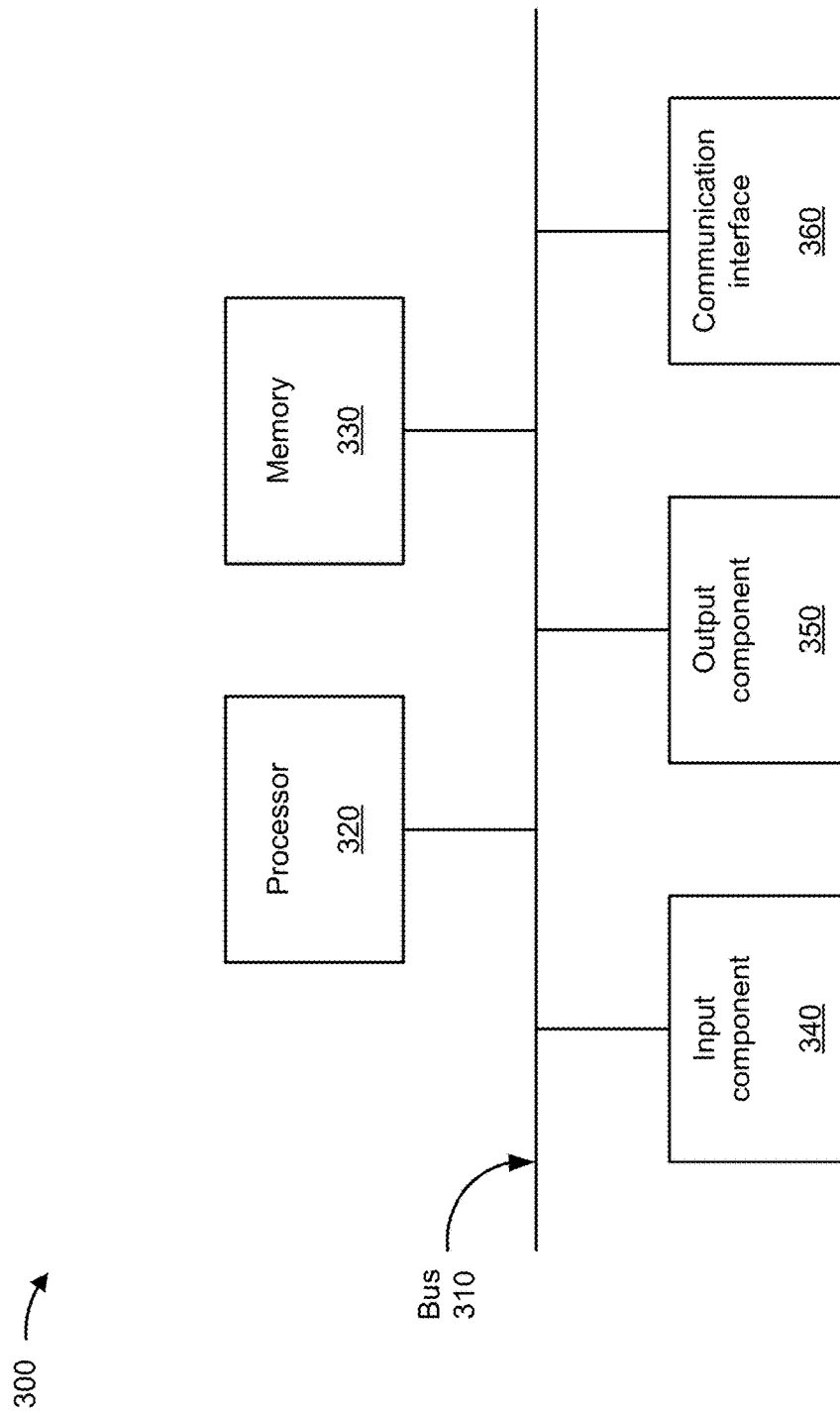
FIG. 3 is a diagram of example components of one or more devices of FIG. 2.

FIG. 3 is a diagram of example components of one or more devices of FIG. 2. The example components may be included in a device 300, which may correspond to the license system 201, the user device 230, and/or the multi-tenant system 240. In some implementations, the license system 201, the user device 230, and/or the multi-tenant system 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
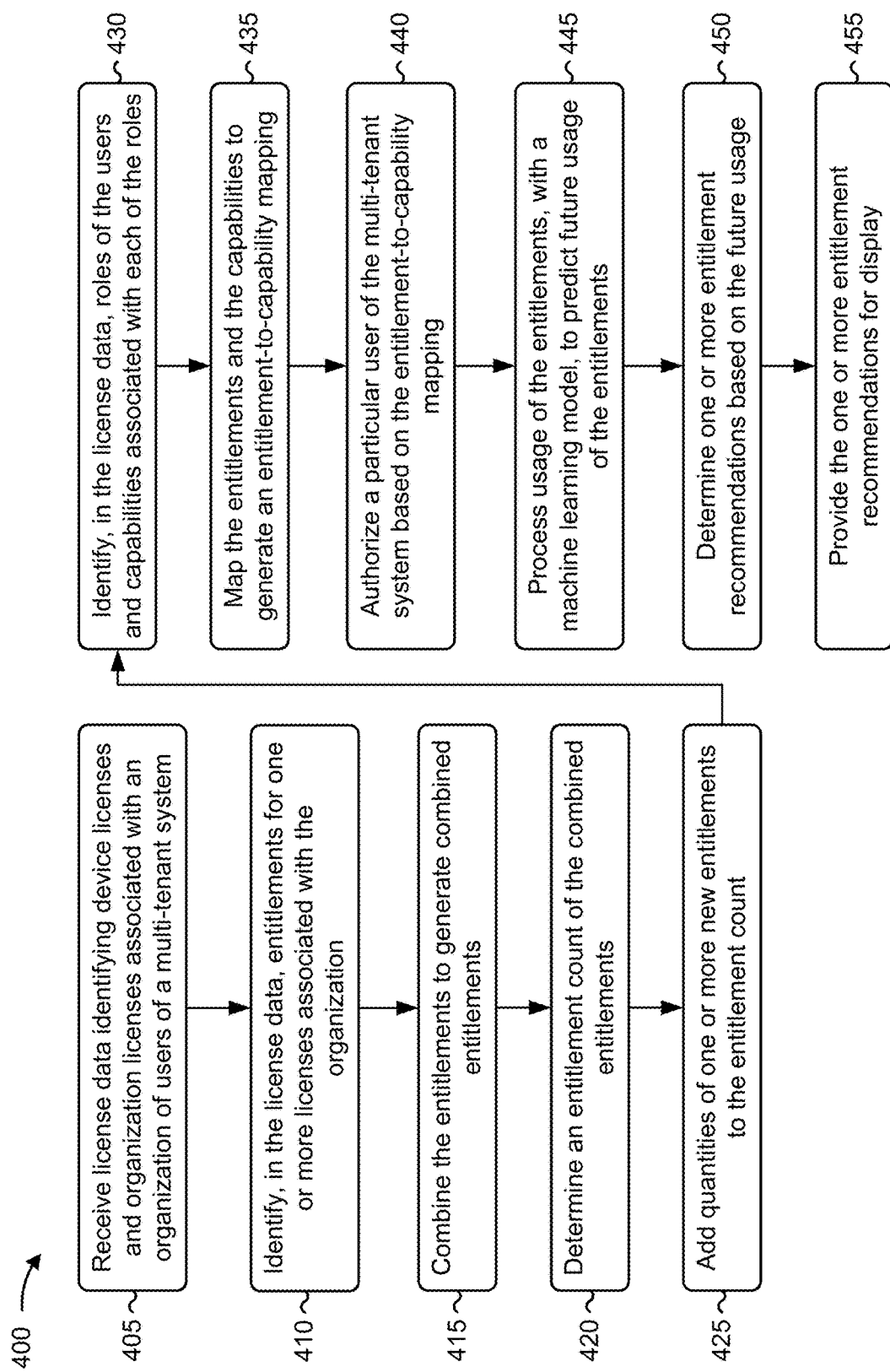
FIG. 4 is a flowchart of an example process for providing programmable model-driven license management and enforcement in a multi-tenant system.

FIG. 4 is a flowchart of an example process 400 for providing programmable model-driven license management and enforcement in a multi-tenant system. In some implementations, one or more process blocks of FIG. 4 may be performed by a device (e.g., the license system 201). In some implementations, one or more process blocks of FIG. 4 may be performed by another device or a group of devices separate from or including the device, such as a user device (e.g., the user device 230), a multi-tenant system (e.g., the multi-tenant system 240). Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving license data identifying device licenses and organization licenses associated with an organization of users of a multi-tenant system (block 405). For example, the device may receive license data identifying device licenses and organization licenses associated with an organization of users of a multi-tenant system, as described above. In some implementations, the license data includes data identifying one or more of names of the device licenses, names of the organization licenses, types associated with the device licenses, types associated with the organization licenses, lists of entitlements associated with the device licenses, lists of entitlements associated with the organization licenses, durations associated with the device licenses, durations associated with the organization licenses, metadata associated with the device licenses, or metadata associated with the organization licenses.

As further shown in FIG. 4, process 400 may include identifying, in the license data, entitlements for one or more licenses associated with the organization (block 410). For example, the device may identify, in the license data, entitlements for one or more licenses associated with the organization, as described above.

As further shown in FIG. 4, process 400 may include combining the entitlements to generate combined entitlements (block 415). For example, the device may combine the entitlements to generate combined entitlements, as described above.

As further shown in FIG. 4, process 400 may include determining an entitlement count of the combined entitlements (block 420). For example, the device may determine an entitlement count of the combined entitlements, as described above.

As further shown in FIG. 4, process 400 may include adding quantities of one or more new entitlements to the entitlement count (block 425). For example, the device may add quantities of one or more new entitlements to the entitlement count, as described above.

As further shown in FIG. 4, process 400 may include identifying, in the license data, roles of the users and capabilities associated with each of the roles (block 430). For example, the device may identify, in the license data, roles of the users and capabilities associated with each of the roles, as described above.

As further shown in FIG. 4, process 400 may include mapping the entitlements and the capabilities to generate an entitlement-to-capability mapping (block 435). For example, the device may map the entitlements and the capabilities to generate an entitlement-to-capability mapping, as described above.

As further shown in FIG. 4, process 400 may include authorizing a particular user of the multi-tenant system based on the entitlement-to-capability mapping (block 440). For example, the device may authorize a particular user of the multi-tenant system based on the entitlement-to-capability mapping, as described above. In some implementations, authorizing the particular user of the multi-tenant system based on the entitlement-to-capability mapping includes receiving a request for authentication of a user device associated with the particular user, and generating, based on the request for authentication, an authentication token for the user device based on particular capabilities associated with a role of the particular user and particular entitlements associated with the particular capabilities. In some implementations, process 400 includes authorizing an application programming interface call, by the user device to the multi-tenant system, based on validating the authentication token.

As further shown in FIG. 4, process 400 may include processing usage of the entitlements, with a machine learning model, to predict future usage of the entitlements (block 445). For example, the device may process usage of the entitlements, with a machine learning model, to predict future usage of the entitlements, as described above. In some implementations, the machine learning model is a univariate time series forecasting model.

As further shown in FIG. 4, process 400 may include determining one or more entitlement recommendations based on the future usage (block 450). For example, the device may determine one or more entitlement recommendations based on the future usage, as described above. In some implementations, the one or more entitlement recommendations include one or more of a recommendation to increase a quantity of a particular entitlement, or a recommendation to add a new entitlement.

As further shown in FIG. 4, process 400 may include providing the one or more entitlement recommendations for display (block 455). For example, the device may provide the one or more entitlement recommendations for display, as described above.

In some implementations, process 400 includes subtracting quantities of one or more expired entitlements from the entitlement count.

In some implementations, process 400 includes receiving a request for utilization of the multi-tenant system, determining whether a license quota associated with a particular capability of the request is satisfied, and generating a response to the request based on whether the license quota is satisfied. In some implementations, the license quota is associated with one or more of an entitlement category associated with the particular capability, a quantity of the particular capability, a usage of the particular capability, or a source of the particular capability.

In some implementations, process 400 includes storing the combined entitlements in the data structure. In some implementations, process 400 includes receiving, from a user device associated with the particular user, a request for authorization to utilize the multi-tenant system, determining first capabilities associated with a particular role of the particular user, determining second capabilities associated with particular entitlements for the particular user, determining whether the first capabilities and the second capabilities substantially match the request, and providing an authorization response based on determining whether the first capabilities and the second capabilities match the request. In some implementations, providing the authorization response based on determining whether the first capabilities and the second capabilities match the request includes denying the request when the first capabilities and the second capabilities fail to match the request, or approving the request when the first capabilities and the second capabilities match the request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, license data identifying device licenses and organization licenses associated with an organization of users of a multi-tenant system;
   identifying, by the device and in the license data, entitlements for one or more licenses associated with the organization;
   combining, by the device, the entitlements to generate combined entitlements;
   determining, by the device, an entitlement count of the combined entitlements;
   adding, by the device, quantities of one or more new entitlements to the entitlement count;
   identifying, by the device and in the license data, roles of the users and capabilities associated with each of the roles;
   mapping, by the device, the entitlements and the capabilities to generate an entitlement-to-capability mapping;
   authorizing, by the device, a particular user of the multi-tenant system based on the entitlement-to-capability mapping;
   processing, by the device, usage of the entitlements, with a machine learning model, to predict future usage of the entitlements;
   determining, by the device, one or more entitlement recommendations based on the future usage; and
   providing, by the device, the one or more entitlement recommendations for display.

2. The method of claim 1, wherein the license data includes data identifying one or more of:
   names of the device licenses,
   names of the organization licenses,
   types associated with the device licenses,
   types associated with the organization licenses,
   lists of entitlements associated with the device licenses,
   lists of entitlements associated with the organization licenses,
   durations associated with the device licenses,
   durations associated with the organization licenses,
   metadata associated with the device licenses, or
   metadata associated with the organization licenses.

3. The method of claim 1, wherein authorizing the particular user of the multi-tenant system based on the entitlement-to-capability mapping comprises:
   receiving a request for authentication of a user device associated with the particular user; and
   generating, based on the request for authentication, an authentication token for the user device based on particular capabilities associated with a role of the particular user and particular entitlements associated with the particular capabilities.

4. The method of claim 3, further comprising:
   authorizing an application programming interface call, by the user device to the multi-tenant system, based on validating the authentication token.

5. The method of claim 1, further comprising:
   subtracting quantities of one or more expired entitlements from the entitlement count.

6. The method of claim 1, further comprising:
receiving a request for utilization of the multi-tenant system;
determining whether a license quota associated with a particular capability of the request is satisfied; and
generating a response to the request based on whether the license quota is satisfied.

7. The method of claim 6, wherein the license quota is associated with one or more of:
an entitlement category associated with the particular capability,
a quantity of the particular capability,
a usage of the particular capability, or
a source of the particular capability.

8. A device, comprising:
one or more memories; and
one or more processors to:
receive license data identifying device licenses and organization licenses associated with an organization of users of a multi-tenant system;
store the license data in a data structure associated with the device;
identify, in the license data, entitlements for one or more licenses associated with the organization;
combine the entitlements to generate combined entitlements;
determine an entitlement count of the combined entitlements;
add quantities of one or more new entitlements to the entitlement count;
identify, in the license data, roles of the users and capabilities associated with each of the roles;
map the entitlements and the capabilities to generate an entitlement-to-capability mapping;
authorize a particular user of the multi-tenant system based on the entitlement-to-capability mapping;
process usage of the entitlements, with a machine learning model, to predict future usage of the entitlements;
determine one or more entitlement recommendations based on the future usage; and
provide the one or more entitlement recommendations for display.

9. The device of claim 8, wherein the license data includes data identifying one or more of:
names of the device licenses,
names of the organization licenses,
types associated with the device licenses,
types associated with the organization licenses,
lists of entitlements associated with the device licenses,
lists of entitlements associated with the organization licenses,
durations associated with the device licenses,
durations associated with the organization licenses,
metadata associated with the device licenses, or
metadata associated with the organization licenses.

10. The device of claim 8, wherein the one or more processors are further to:
store the combined entitlements in the data structure.

11. The device of claim 8, wherein the one or more processors are further to:
receive, from a user device associated with the particular user, a request for authorization to utilize the multi-tenant system;
determine first capabilities associated with a particular role of the particular user;
determine second capabilities associated with particular entitlements for the particular user;
determine whether the first capabilities and the second capabilities substantially match the request; and
provide an authorization response based on determining whether the first capabilities and the second capabilities match the request.

12. The device of claim 11, wherein the one or more processors, to provide the authorization response based on determining whether the first capabilities and the second capabilities match the request, are to:
deny the request when the first capabilities and the second capabilities fail to match the request; or
approve the request when the first capabilities and the second capabilities match the request.

13. The device of claim 8, wherein the machine learning model is a univariate time series forecasting model.

14. The device of claim 8, wherein the one or more entitlement recommendations include one or more of:
a recommendation to increase a quantity of a particular entitlement, or
a recommendation to add a new entitlement.

15. A non-transitory computer-readable medium storing a set of instructions, the set of instructions comprising:
one or more instructions that, when executed by one or more processors of a device, cause the device to:
receive license data identifying device licenses and organization licenses associated with an organization of users of a multi-tenant system;
identify, in the license data, entitlements for one or more licenses associated with the organization;
combine the entitlements to generate combined entitlements;
determine an entitlement count of the combined entitlements;
add quantities of one or more new entitlements to the entitlement count;
subtract quantities of one or more expired entitlements from the entitlement count;
identify, in the license data, roles of the users and capabilities associated with each of the roles;
map the entitlements and the capabilities to generate an entitlement-to-capability mapping;
authorize a particular user of the multi-tenant system based on the entitlement-to-capability mapping;
process usage of the entitlements, with a machine learning model, to predict future usage of the entitlements;
determine one or more entitlement recommendations based on the future usage; and
provide the one or more entitlement recommendations for display.

16. The non-transitory computer-readable medium of claim 15, wherein the one or more instructions, that cause the device to authorize the particular user of the multi-tenant system based on the entitlement-to-capability mapping, cause the device to:
receive a request for authentication of a user device associated with the particular user; and
generate, based on the request for authentication, an authentication token for the user device based on particular capabilities associated with a role of the particular user and particular entitlements associated with the particular capabilities.

17. The non-transitory computer-readable medium of claim 15, wherein the one or more instructions further cause the device to:

receive a request for utilization of the multi-tenant system;

determine whether a license quota associated with a particular capability of the request is satisfied; and generate a response to the request based on whether the license quota is satisfied.

18. The non-transitory computer-readable medium of claim 15, wherein the one or more instructions further cause the device to:

receive, from a user device associated with the particular user, a request for authorization to utilize the multi-tenant system;

determine first capabilities associated with a particular role of the particular user;

determine second capabilities associated with particular entitlements for the particular user;

determine whether the first capabilities and the second capabilities match the request; and provide an authorization response based on determining whether the first capabilities and the second capabilities match the request.

19. The non-transitory computer-readable medium of claim 18, wherein the one or more instructions, that cause the device to provide the authorization response based on determining whether the first capabilities and the second capabilities match the request, cause the device to:

deny the request when the first capabilities and the second capabilities fail to match the request; or approve the request when the first capabilities and the second capabilities match the request.

20. The non-transitory computer-readable medium of claim 15, wherein the one or more entitlement recommendations include one or more of:

a recommendation to increase a quantity of a particular entitlement, or a recommendation to add a new entitlement.

* * * * *